(12) United States Patent
Nakatake et al.

(10) Patent No.: US 10,044,241 B2
(45) Date of Patent: Aug. 7, 2018

(54) COIL INSULATING STRUCTURE/BOBBIN WITH GROOVES FOR INSERTING INSULATING SLOT CLOSER

(71) Applicants: Kouji Nakatake, Tokyo (JP); Yasushi Yoda, Tokyo (JP); Masaaki Ohashi, Tokyo (JP)

(72) Inventors: Kouji Nakatake, Tokyo (JP); Yasushi Yoda, Tokyo (JP); Masaaki Ohashi, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 158 days.

(21) Appl. No.: 14/466,352

(22) Filed: Aug. 22, 2014

(65) Prior Publication Data

US 2015/0061452 A1     Mar. 5, 2015

(30) Foreign Application Priority Data

Sep. 4, 2013   (JP) ................................. 2013-183342
Jun. 2, 2014   (JP) ................................. 2014-114150

(51) Int. Cl.
| | |
|---|---|
| *H02K 3/00* | (2006.01) |
| *H02K 3/487* | (2006.01) |
| *H02K 3/32* | (2006.01) |
| *H02K 3/52* | (2006.01) |

(52) U.S. Cl.
CPC ............ *H02K 3/487* (2013.01); *H02K 3/325* (2013.01); *H02K 3/522* (2013.01); *H02K 2203/12* (2013.01)

(58) Field of Classification Search
CPC ............ H02K 3/30; H02K 3/325; H02K 3/32; H02K 3/34; H02K 3/487; H02K 3/522; H02K 2203/12

USPC .............................. 310/71, 114, 115, 214, 215
See application file for complete search history.

(56) References Cited

U.S. PATENT DOCUMENTS

| | | | | |
|---|---|---|---|---|
| 6,008,563 A * | 12/1999 | Baba ...................... | H02K 1/146 310/194 |
| 9,300,179 B2 * | 3/2016 | Sawada ................... | H02K 3/34 |
| 2009/0085421 A1 * | 4/2009 | Saito ...................... | H02K 3/12 310/214 |
| 2009/0243408 A1 * | 10/2009 | Ueta ....................... | H02K 1/148 310/71 |

(Continued)

FOREIGN PATENT DOCUMENTS

| | | |
|---|---|---|
| JP | H1075544 A | 3/1998 |
| JP | 3819989 B2 | 9/2006 |

(Continued)

OTHER PUBLICATIONS

JP 2006345692 English Translation.*
Korean Office Action for Korean Patent Application No. 10-2014-0116202, dated Nov. 14, 2017.

*Primary Examiner* — Maged Almawri
(74) *Attorney, Agent, or Firm* — Drinker Biddle & Reath LLP

(57) ABSTRACT

A coil is wound via an electrically insulating member within a slot of a stator core of an electromagnetic motor which is formed of a stator and a rotor. Groove portions are formed to oppose one another in respective opposing portions of a slot opening portion side of the electrically insulating member. An electrically insulating sheet is disposed by being inserted into the pair of groove portions.

4 Claims, 8 Drawing Sheets

(56) References Cited

U.S. PATENT DOCUMENTS

| | | | |
|---|---|---|---|
| 2009/0289520 A1* | 11/2009 | Takeshita | H02K 3/487 |
| | | | 310/214 |
| 2012/0080976 A1* | 4/2012 | Oka | H02K 3/522 |
| | | | 310/215 |
| 2013/0115064 A1* | 5/2013 | Kimura | H02K 3/522 |
| | | | 415/177 |

FOREIGN PATENT DOCUMENTS

| JP | 2006345692 | * | 12/2006 |
| JP | 201255098 A | | 3/2012 |

* cited by examiner

COIL INSULATING STRUCTURE/BOBBIN WITH GROOVES FOR INSERTING INSULATING SLOT CLOSER

BACKGROUND

1. Technical Field

The present invention relates to an improvement in a coil insulating structure of an electromagnetic motor stator for securing an electrical insulation distance between a coil which is wound within a slot of a stator and a stator core.

2. Description of Related Art

As the electromagnetic motor, for example, a brushless motor, a PM-type motor (a Permanent Magnet Motor), a hybrid-type motor and the like are known.

A coil is wound within the slot of the stator core of the electromagnetic motor via an electrically insulating member (hereinafter simply referred to as an "insulating member"). In order to ensure that the insulating structure of the coil complies with foreign safety standards (UL and CSA standards, and the like), it is necessary to secure the electrical insulation distance between the coil and the stator core.

Since an automatic winding apparatus is used for the winding process of the coil, a slot opening portion is open. Therefore, in particular, in small electromagnetic motors, the creepage distance or the spatial distance between the coil and the stator core is insufficient. Therefore, as a measure to secure the electrical insulation distance between the coil and the stator core, an electrically insulating sheet (hereinafter simply referred to as an "insulating sheet") is disposed by being inserted between the coil and the insulating member which is mounted within the slot.

However, the insulating member which is mounted within the slot does not have a structure in which it is possible to dispose the insulating sheet by insertion. Therefore, it was necessary to manually mount the insulating sheet between the coil and the insulating member, and the mounting work of the insulating sheet was time consuming.

In the related art, various technologies relating to the coil insulating structure of the electromagnetic motor stator have been proposed. For example, a coil insulating structure of an electromagnetic motor with a structure in which the insulating sheet is easy to insert due to providing a step in the insulating member such that a gap is formed between the insulating member and the stator has been disclosed (refer to Japanese Patent No. 3819989).

A rotary electric machine armature in which a coil position regulating protrusion for regulating a winding position of the coil is formed integrally with a slot insulating member such that, when inserting a wedge (the insulating sheet) between the slot insulating member and a coil portion, the space into which the wedge is inserted does not narrow has been disclosed (refer to Japanese Unexamined Patent Application Publication No. 10-75544).

SUMMARY

Incidentally, in the technology of Japanese Patent No. 3819989, since the thickness of the location with the step for inserting the insulating sheet into the insulating member becomes thinner, it is difficult to mold the insulating member, and the member breaks easily.

Meanwhile, in the technology of Japanese Unexamined Patent Application Publication No. 10-75544, the occupation area of the coil is suppressed by the presence of the coil position regulating protrusion for regulating the winding position of the coil.

In a state in which the insulating member is mounted within the slot, the slot opening portion is inclined from the slot center line and uneven; thus, the occupation area of the coil was reduced.

The present invention has been made in consideration of the above circumstances, and an object thereof is to provide a coil insulating structure of an electromagnetic motor stator which is capable of securing an electrical insulation distance between a coil and a stator core with a simple structure, and is capable of securing an occupation area of the coil without influencing the molding of an insulating member in a negative manner.

A coil insulating structure of an electromagnetic motor stator according to the present invention for achieving the object described above is formed by winding a coil via an electrically insulating member within a slot of a stator core of an electromagnetic motor formed of a stator and a rotor. Groove portions are formed to oppose one another in respective opposing portions of a slot opening portion side of the electrically insulating member. An electrically insulating sheet is disposed by being inserted into the pair of groove portions.

According to the coil insulating structure of an electromagnetic motor stator according to the present invention, groove portions are formed to oppose one another in respective opposing portions of the slot opening portion side of the electrically insulating member. Since the electrically insulating sheet may be disposed by being inserted into the pair of groove portions, the insulating sheet is easy to insert and the workability of the insertion work of the insulating sheet is improved.

Since the groove portions are formed to oppose one another in the respective opposing portions of the slot opening portion side of the electrically insulating member, the thickness of a bent molded portion of the insulating member is substantially uniform, and the molding of the insulating member is not influenced in a negative manner.

It is possible to secure the electrical insulation distance between the coil and a stator core with a simple structure in which the groove portions are formed to oppose one another in the respective opposing portions of the slot opening portion side of the electrically insulating member, and the electrically insulating sheet is simply inserted into the pair of groove portions.

DETAILED DESCRIPTION

Hereinafter, description will be given of the coil insulating structure of the electromagnetic motor stator according to the first embodiment and the second embodiment with reference to the drawings.

In the coil insulating structure of the electromagnetic motor stator according to the first and second embodiments, groove portions are formed to oppose one another in respective opposing portions of the slot opening portion side of the electrically insulating member, and an electrically insulating sheet is disposed by being inserted into the pair of groove portions. Therefore, according to the first and second embodiments, it is possible to realize a coil insulating structure of an electromagnetic motor stator which is capable of securing an electrical insulation distance between the coil and the stator core with a simple structure, without influencing the molding of the insulating member in a negative manner.

First Embodiment

[Configuration of Coil Insulating Structure of Electromagnetic Motor Stator]

Figure 1:
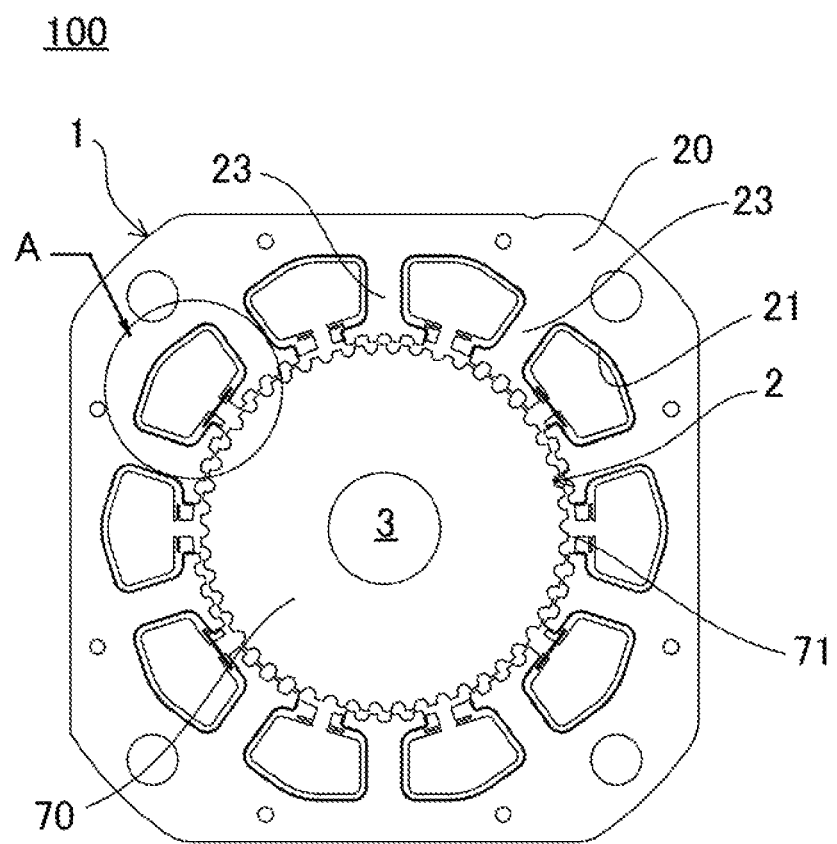
FIG. 1 is a schematic diagram of the overall configuration of an electromagnetic motor according to a first embodiment.
Figure 2:
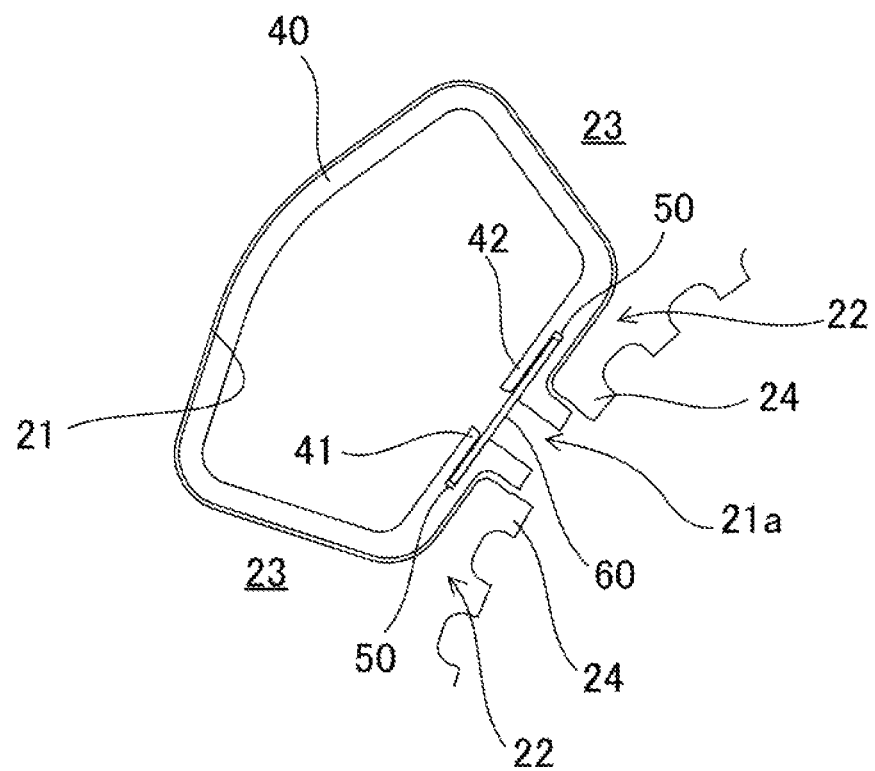
FIG. 2 is an enlarged view of an A portion of FIG. 1.
Figure 3:
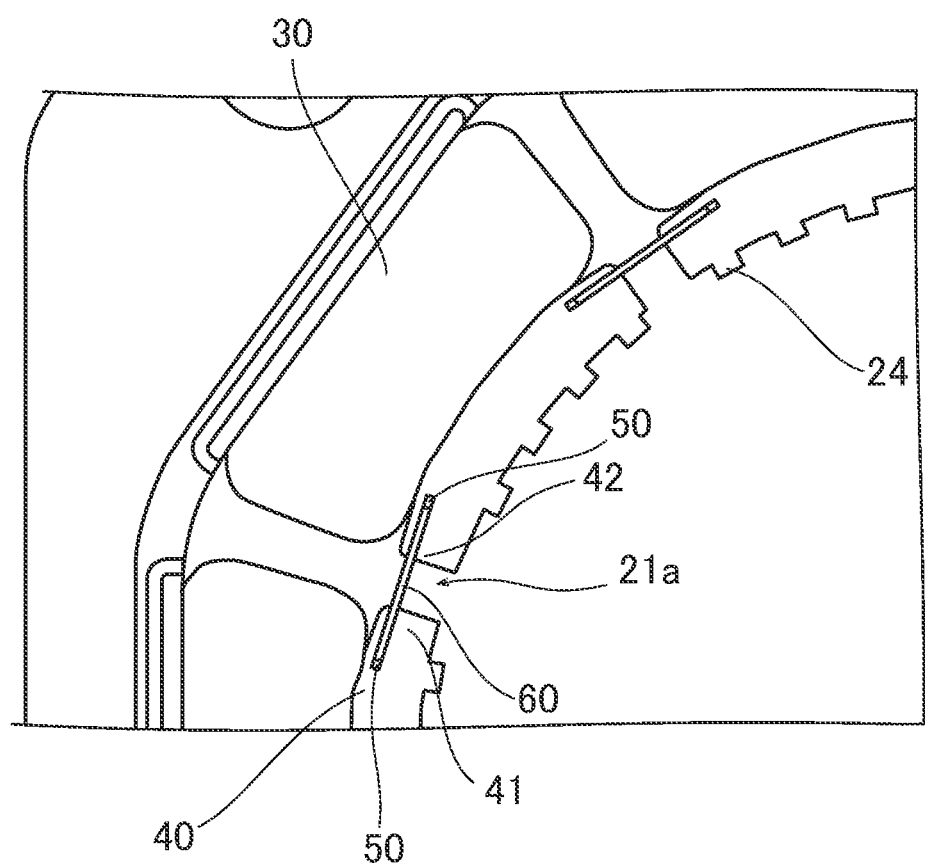
FIG. 3 is a plan view of the main parts of a coil structure of the electromagnetic motor stator according to the first embodiment.

First, description will be given of the configuration of the coil insulating structure of the electromagnetic motor stator according to the first embodiment with reference to FIGS. 1 to 3. FIG. 1 is a schematic diagram of the overall configuration of the electromagnetic motor according to the first embodiment. FIG. 2 is an enlarged view of the A portion of FIG. 1. FIG. 3 is a perspective view of the main parts of the coil structure of the electromagnetic motor stator according to the first embodiment. Note that, depiction of coils 30 is omitted from FIGS. 1 and 2.

An electromagnetic motor 100 exemplified in FIG. 1 is a hybrid-type (HB-type) stepping motor, and is provided with a stator 1 and a rotor 2.

The stator 1 includes a stator core 20 and a coil.

The stator core 20 is a thick barrel-shaped metal member. The inner circumferential surface of the stator core has the shape of an internal gear, and the outer circumferential surface has a substantially octagonal shape. The outer circumferential shape of the stator core 20 may be round or cross shaped, and the outer circumferential shape is arbitrary and not limited. The stator core 20 of the present embodiment has a stacked structure in which thin sheets are laminated; however, the stator core 20 may also have a singular structure or a compacted powder core.

As shown in FIGS. 1 to 3, a plurality of slots 21 are partitioned and formed on the inner circumferential side of the stator core 20 in a radial shape so as to face the rotor 2 as spaces for accommodating coils 30 (depiction omitted from FIGS. 1 and 2).

Each of the slots 21 is partitioned and formed between teeth 22 and 22 (refer to FIG. 2). The base end portion of each of the teeth 22 is a salient pole 23 around which the coil 30 (refer to FIG. 3) is wound. A plurality of gear-shaped small teeth 24 are provided to protrude from the inner circumferential surface of each of the teeth 22 (refer to FIG. 2).

A silicon steel plate is used, for example, as a component material of the stator core 20; however, the component material is not limited to the exemplified materials.

The coils 30 are disposed within the slots 21 via the electrically insulating member (hereinafter simply referred to as the "insulating member") 40 (refer to FIG. 3). Since the coils 30 are wound around the salient poles 23 between the slots 21 and 21, the numbers of the slots 21 and the coils 30 correspond to one another. In the present embodiment, the coils 30 are wound within 10 of the slots 21; however, the number of the slots 21 is not limited.

As shown in FIG. 2, the insulating member 40 is mounted along the inner surface of the slot 21. The insulating member 40 of the present embodiment is not only mounted within the slots 21, but also in slot opening portions 21a. In other words, the insulating member 40 has a substantially rectangular C-shape. Both end portions of the C-shaped insulating member 40 are disposed to protrude to face the inside of the slot opening portion 21a.

The insulating member 40 is formed such that the thickness of the slot opening portion 21a side is slightly thicker than the other portions. The thickness of the bent molded portion of the insulating member has a substantially uniform thickness.

Examples of the component material of the insulating member 40 include synthetic resins such as phenol, nylon, PBT and the like, but are not limited to the exemplified component materials. The dimensions such as the thickness and the length of the insulating member 40 are set as appropriate according to the area of the inner circumferential surface of the slot 21.

Groove portions 50 and 50 are formed in respective opposing portions 41 and 42 of the slot opening portion 21a side of the insulating member 40. Each of the groove portions 50 has a straight shape. The groove portions 50 and 50 are formed to oppose one another.

An electrically insulating sheet (hereinafter, referred to simply as the "insulating sheet") 60 is disposed by being inserted into the pair of groove portions 50 and 50. Since the insulating sheet 60 is interposed between the coil and the stator core 20, it is possible to secure the electrical insulation distance between the coil 30 and the stator core 20.

Examples of the component material of the insulating sheet 60 include a material which is obtained by molding glass fibers into a sheet shape using a synthetic resin such as epoxy resin, polyester or polyethylene terephthalate, but are not limited to the exemplified component materials. The insulating sheet 60 has a plate shape. The dimensions such as the thickness and the length of the insulating sheet 60 are set as appropriate according to the opening width or the like of the slot opening portion 21a.

Referring once more to FIG. 1, the rotor 2 is provided around the shaft 3, and includes a rotor core 70 and a permanent magnet (not shown). The shaft 3 is the center of rotation of the rotor 2.

The rotor core 70 of the rotor 2 is a substantially thick cylindrical metal member which is provided around the shaft 3. A plurality of external gear shaped small teeth 71 are formed on the outer circumferential surface of the rotor core 70. The small teeth 71 are disposed at equal intervals in the circumferential direction of the rotor core 70.

A silicon steel plate is used, for example, as a component material of the rotor core 70; however, the component material is not limited to the exemplified materials.

The permanent magnet is formed of a thin disc-shaped magnet which is interposed between the pair of rotor cores 70 and 70 which are disposed to the front and the rear in the axial direction. Examples of the permanent magnet include rare-earth magnets such as a neodymium magnet; however the material is not limited thereto.

[Effects of Coil Insulating Structure of Electromagnetic Motor Stator]

Next, description will be given of the effects of the coil insulating structure of the electromagnetic motor stator according to the first embodiment with reference to FIGS. 1 to 3.

The electromagnetic motor stator 1 according to the first embodiment is provided to surround the rotor 2. The stator core 20 includes the plurality of coils 30 which are lined up radially to face the rotor 2. The coil 30 is wound within the slot 21 of the stator core 20 via the insulating member 40.

As described earlier, in order to ensure that the insulating structure of the coil 30 complies with foreign safety standards (UL and CSA standards, and the like), it is necessary to secure the electrical insulation distance between the coil 30 and the stator core 20.

After performing the winding process of the coil 30, the slot opening portion 21a is open. Therefore, it is necessary to interpose the insulating sheet 60 between the coil 30 and the stator core 20 to block the slot opening portion 21a. In particular, in the small electromagnetic motor 100, it is necessary to secure the creepage distance or the spatial distance from the stator core 20.

According to the coil insulating structure of the electromagnetic motor stator according to the first embodiment, the groove portions 50 and 50 are formed in the respective opposing portions 41 and 42 of the slot opening portion 21a side of the insulating member 40. The groove portions 50 and 50 oppose one another. Therefore, since the insulating sheet 60 may be disposed by being inserted into the pair of groove portions 50 and 50 to bridge therebetween, the insulating sheet 60 is easy to insert and the workability of the insertion work of the insulating sheet 60 is improved.

Since the groove portions 50 and 50 are formed in the opposing portions 41 and 42 of the slot opening portion 21a side of the insulating member 40, the thickness of a bent molded portion of the insulating member 40 is substantially uniform, and the molding of the insulating member 40 is not influenced in a negative manner.

In other words, the coil insulating structure of the electromagnetic motor stator according to the first embodiment is capable of securing the electrical insulation distance between the coil 30 and a stator core 20 with a simple structure in which the groove portions 50 and 50 are formed to oppose one another in the respective opposing portions 41 and 42 of the slot opening portion 21a side of the insulating member 40, and the insulating sheet 60 is simply inserted into the pair of groove portions 50 and 50.

Second Embodiment

Figure 4:
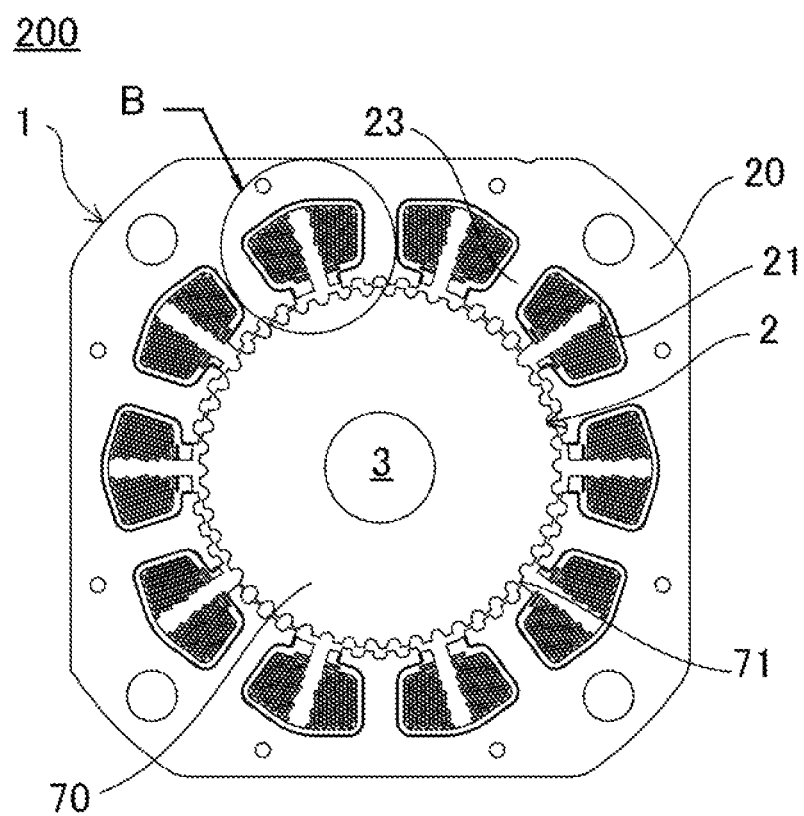
FIG. 4 is a schematic view of the overall configuration of an electromagnetic motor according to a second embodiment.
Figure 5:
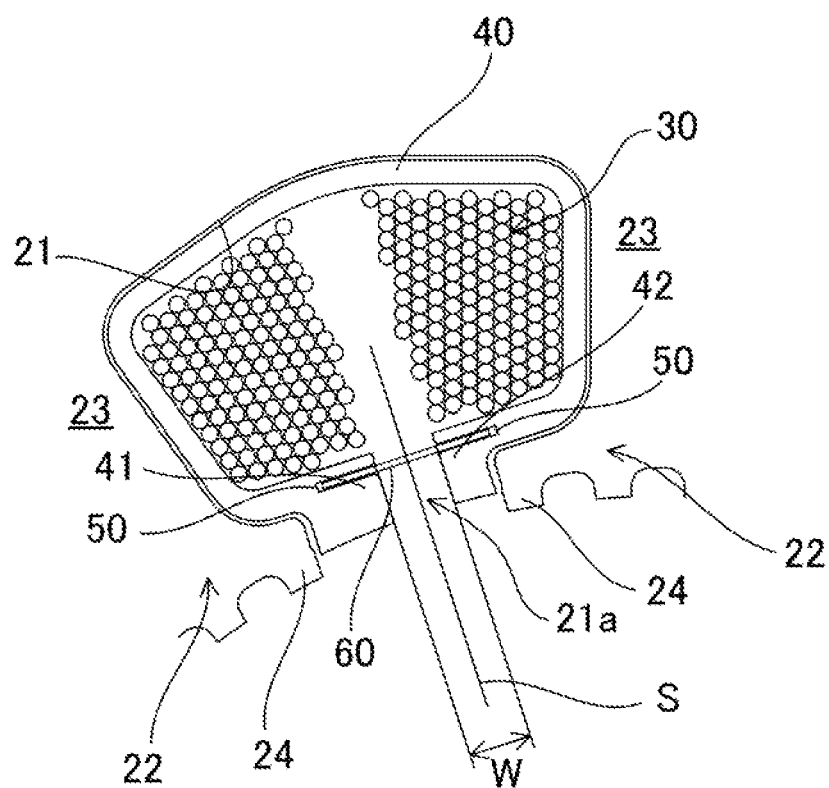
FIG. 5 is an enlarged view of a B portion of FIG. 4.
Figure 6:
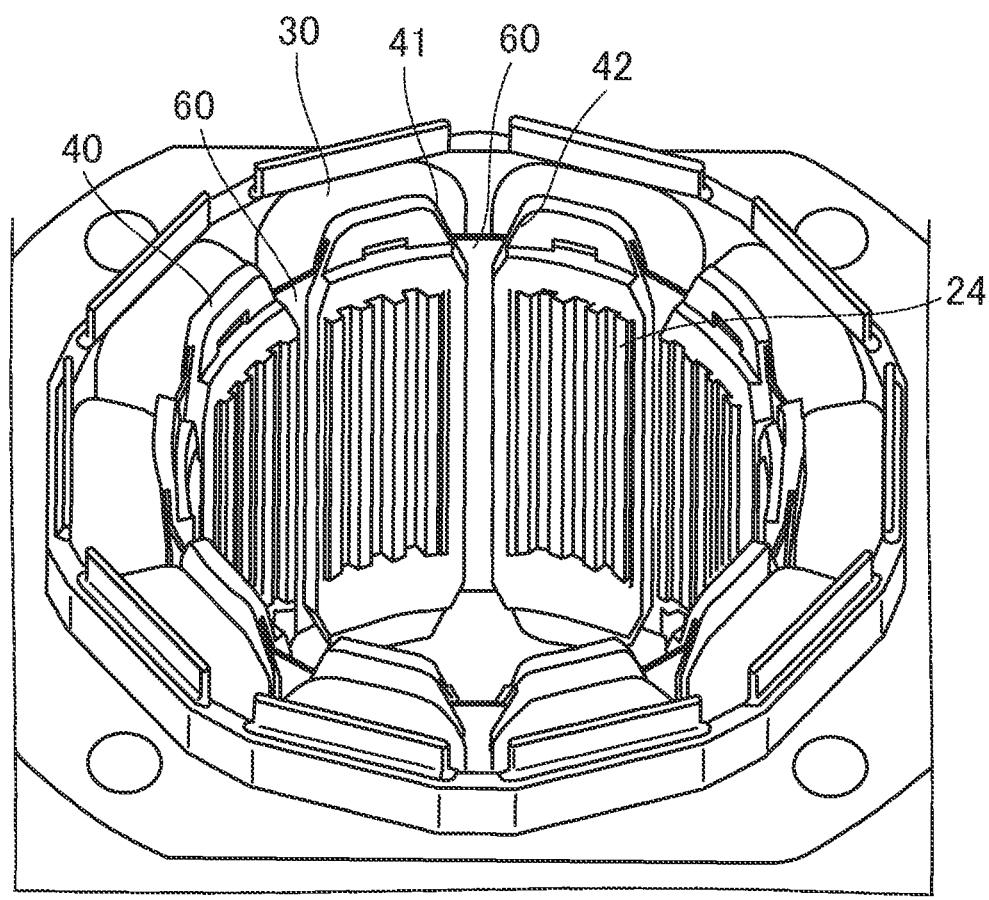
FIG. 6 is a perspective view of the main parts of a coil structure of the electromagnetic motor stator according to the second embodiment.

Next, description will be given of the configuration of the coil insulating structure of the electromagnetic motor stator according to the second embodiment with reference to FIGS. 4 to 8. FIG. 4 is a schematic view of the overall configuration of the electromagnetic motor according to the second embodiment. FIG. 5 is an enlarged view of the B portion of FIG. 4. FIG. 6 is a perspective view of the main parts of a coil structure of the electromagnetic motor stator according to the second embodiment. Note that components which are the same as those in the first embodiment are assigned identical reference numerals, and their descriptions are omitted here.

An electromagnetic motor 200 exemplified in FIG. 4, in the same manner as in the first embodiment, is a hybrid-type (HB-type) stepping motor, and is provided with the stator 1 and the rotor 2.

As shown in FIGS. 4 to 6, the coil insulating structure of the electromagnetic motor stator according to the second embodiment has a different structure of the opposing portions 41 and 42 of the slot opening portion 21a side of the insulating member 40 from that of the first embodiment.

In other words, in the coil insulating structure of the electromagnetic motor stator according to the second embodiment, the thickness of the opposing portions 41 and 42 of the slot opening portion 21a side of the insulating member 40 is increased. The thickness of the opposing portions 41 and 42 is increased such that a width W of the slot opening portion 21a is uniform in relation to a slot center line S in a state in which the insulating member 40 is mounted within the slot 21.

Specifically, both end portions of the substantially rectangular C-shaped insulating member 40 are disposed to protrude to face the inside of the slot opening portion 21a. The portions which are disposed to protrude to face the inside of the slot opening portion 21a are the opposing portions 41 and 42 of the embodiment. As shown in FIG. 5, since the width W of the slot opening portion 21a is uniform in relation to the slot center line S, the thickness of the opposing portion 41 of the side which is inclined from the slot center line S is set to be greater than the thickness of the opposing portion 42 of the other side.

In the coil insulating structure according to the second embodiment, since the thickness of the insulating member 40 of the opposing portions 41 and 42 is increased such that the width W of the slot opening portion 21a is uniform in relation to the slot center line S in a state in which the insulating member 40 is mounted within the slot 21, it is possible to remove the inclination of the slot opening portion 21a from the slot center line S and secure the occupation area of the coil 30.

Figure 8:
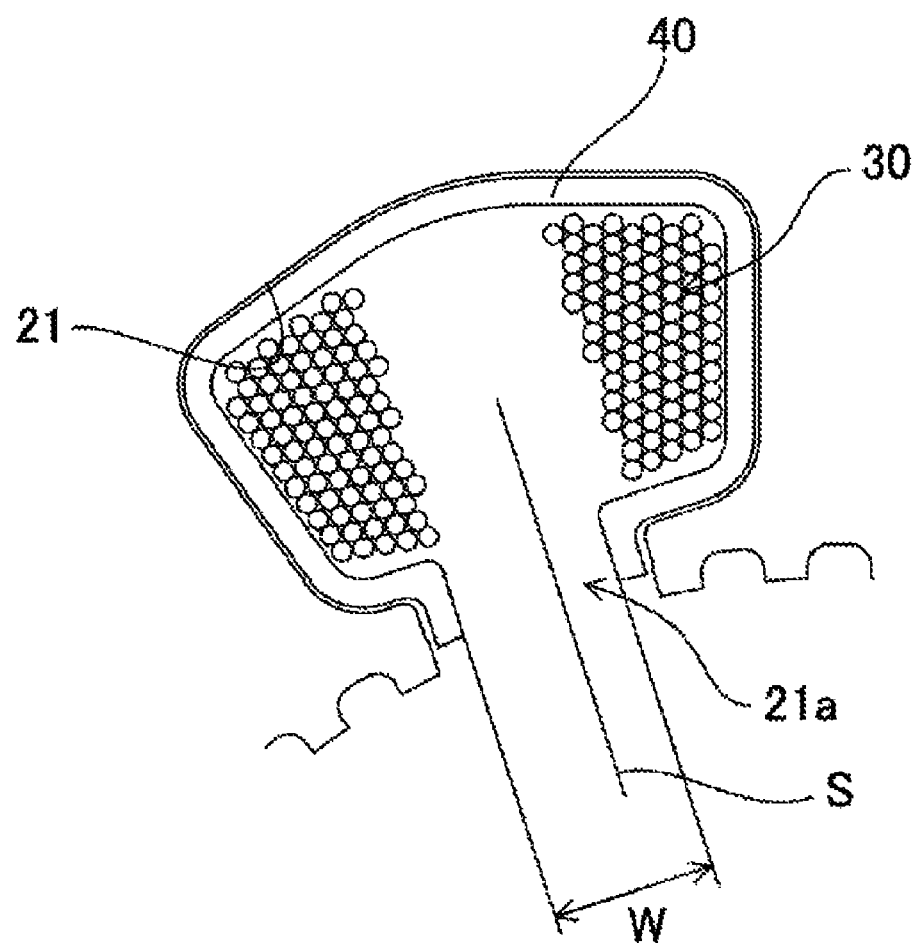
FIG. 8 is an enlarged view of the main parts of a coil insulating structure of a comparative embodiment.

FIG. 8 is an enlarged view of the main parts of the coil insulating structure of the comparative embodiment. The operational effects of the coil insulating structure of the present embodiment become clear when comparison is drawn against the coil insulating structure of the comparative embodiment. As shown in FIG. 8, in the coil insulating structure of the comparative example, the width W of the slot opening portion 21a is inclined in relation to the slot center line S in a state in which the insulating member 40 is mounted within the slot 21. It can be understood that, when the width W of the slot opening portion 21a is inclined in relation to the slot center line S, the occupation area of the coil 30 is reduced.

Referring once more to FIGS. 5 and 6, in the coil insulating structure according to the second embodiment, the groove portions 50 and 50 are formed to oppose one another in the respective opposing portions 41 and 42 of the slot opening portion 21a side of the insulating member 40, and the insulating sheet 60 is inserted into the pair of groove portions 50 and 50. Therefore, according to the coil insulating structure according to the second embodiment, it is possible to secure the electrical insulation distance between the coil 30 and the stator core 20 with a simple structure. In FIGS. 5 and 6, the insulating sheets 60 are inserted into all of the groove portions 50 and 50 of the opposing portions 41 and 42 of the slot opening portion 21a side.

Figure 7:
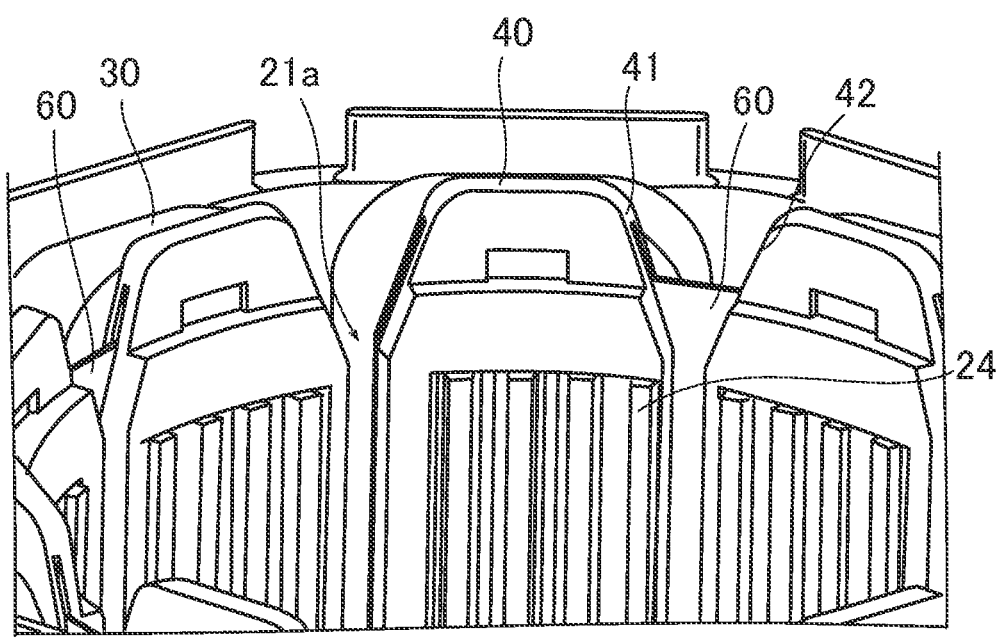
FIG. 7 is a perspective view of the main parts of a modification example of the coil structure of the electromagnetic motor stator according to the second embodiment.

FIG. 7 is a perspective view of the main parts of the modification example of the coil structure of the electromagnetic motor stator according to the second embodiment. In the modification example shown in FIG. 7, the insulating sheets 60 are inserted into the alternate groove portions 50 and 50 of the opposing portions 41 and 42 of the slot opening portion 21a side. In the coil structure according to the second embodiment, since the thickness of the insulating member 40 of the opposing portions 41 and 42 of the slot opening portion 21a side is increased, it is possible to reduce the width of the slot opening portion 21a (refer to FIG. 5). Therefore, not all the slot opening portions 21a necessarily need to be blocked by the insulating sheets 60. Note that the groove portions 50 and 50 may not be formed in the opposing portions 41 and 42 of the insulating members 40 of parts into which the insulating sheets 60 are not inserted.

The coil insulating structure of the electromagnetic motor stator according to the second embodiment achieves essentially the same operational effects as that of the first embodiment. In the coil insulating structure of the electromagnetic motor stator according to the second embodiment, the thickness of the insulating member 40 of the opposing portions 41 and 42 of the slot opening portion 21a side is increased such that the width W of the slot opening portion 21a is uniform in relation to the slot center line S in the state in which the insulating member 40 is mounted within the slot 21. Therefore, according to the coil insulating structure of the electromagnetic motor stator according to the second embodiment, a beneficial effect is achieved which is capable of removing the inclination of the slot opening portion 21a from the slot center line S and securing the occupation area of the coil 30.

Although preferred embodiments of the present invention have been described above, these are examples for describing the present invention, and the scope of the present invention is not intended to be limited to these embodiments. The present invention can be embodied in various aspects different from the above-described embodiments within the gist of the present invention.

The entire disclosure of Japanese Patent Application No. 2013-183342 filed on Sep. 4, 2013 including specification, claims, drawings and summary are incorporated herein by reference in its entirety.

What is claimed is:

1. A coil insulating structure of an electromagnetic motor formed of a stator and a rotor and comprising a plurality of slots, formed by winding a coil via an electrically insulating member within at least one slot of a stator core of the electromagnetic motor, wherein the electrically insulating member is mounted along the inner surface of the at least one slot in a substantially rectangular C-shape, comprising end portions disposed to protrude inward in a radial direction along a slot opening portion to face the inside of the slot opening portion, wherein groove portions are formed to oppose one another in respective opposing portions of the slot opening portion side of the electrically insulating member, and a separate, flat electrically insulating sheet inserted into the pair of groove portions so as to close the slot opening;

wherein the sheet is inserted between the coil and the stator core so as to secure the electrical insulation distance between the coil and the stator core;

wherein a thickness of the electrically insulating member of the opposing portions of the slot opening portion side is increased such that the thickness of the opposing portion on one side is greater than the thickness of the opposing portion on the other side, and such that a width of the slot opening portion is uniform in relation to a slot center line in a state in which the electrically insulating member is mounted within the slot.

2. The coil insulating structure of an electromagnetic motor stator according to claim 1, wherein the electrically insulating member and the electrically insulating sheet are separate members, and the electrically insulating sheet has a plate shape.

3. The coil insulating structure of an electromagnetic motor stator according to claim 1, wherein the electrically insulating member is substantially C-shaped in cross sectional view, and the groove portions are formed in respective opposing portions of the slot opening portion side of the electrically insulating member, to straightly extend in an axial direction of the stator.

4. The coil insulating structure of an electromagnetic motor stator according to claim 1, wherein the slot opening portion is closed by inserting and positioning the electrically insulating sheet into the groove portions.

* * * * *